Patented Jan. 9, 1934

1,942,485

UNITED STATES PATENT OFFICE 1,942,485

PURIFICATION OF GASES

Floyd J. Metzger, New York, N. Y., assignor to Air Reduction Company, Incorporated, New York, N. Y., a corporation of New York No Drawing. Application February 27, 1932
Serial No. 595,659

5 Claims. (Cl. 23—150)

This invention relates to the purification of gases and particularly to the removal of constituents which impart taste or odor to gases, such as carbon dioxide, which are used in connection with products intended for human alimentary consumption and for other purposes.

Carbon dioxide prepared and sold for purposes such as the charging of beverages has been subjected heretofore to various treatments for the purpose of removing noxious tastes and odors therefrom. The commercial product has not, however, been free from objectionable constituents, and disputes and claims arise frequently between manufacturers, distributors and users because of the failure of available purification methods to accomplish their intended purpose.

Carbon dioxide for commercial distribution is compressed to a pressure of usually about 1000 pounds per square inch and is stored in steel containers as a liquid. Within comparatively recent time, the commercial preparation and sale of carbon dioxide in solid form has been developed and it has been suggested that such solid carbon dioxide can be placed in steel receptacles and permitted to liquefy therein. In either case, the gas is withdrawn as desired by opening a valve which permits reduction of the pressure and consequent vaporization of the liquid.

It is a comparatively simple matter to purify carbon dioxide at low pressure but no satisfactory method of treating the gas at the high pressure after final compression has been available heretofore. Unfortunately, the gas acquires objectionable odor and taste in the final stage of compression, due, probably, to partial decomposition of the lubricant employed in the compressor. Such odor and taste are preserved in the liquid or solid carbon dioxide and appear again when the liquid or solid is vaporized. Especially in the case of solid carbon dioxide which is subsequently liquefied and vaporized, the odor and taste tend to accumulate in the receptacle and to contaminate the product in a highly objectionable manner.

It is the object of the present invention to provide a simple and effective method of purifying carbon dioxide and similar gases and especially to effect the substantially complete removal of objectionable odor and taste therefrom while the gases are under high pressure as after the final stage of compression thereof.

In carrying out the invention, I may employ the usual equipment such as compressor for compressing the gas in stages with the customary intercoolers, purifiers and driers before and intermediate the stages of compression. In the first stage, the pressure may be raised to 75–100 pounds per square inch, in the second to approximately 250 pounds per square inch, and finally to the full pressure of about 1000 pounds per square inch.

The gas at this stage is still in the gaseous phase because of the temperature resulting from compression which will usually be about 350° F. It may, however, be cooled to a temperature above the critical temperature of about 88° F. The gas at high pressure and at a temperature which avoids liquefaction is treated with a solution of an alkali metal permanganate. The gas is brought into intimate contact with the permanganate solution in any suitable manner such, for example, as by directing the gas through a spray of the solution or over films of the solution flowing across extensive surfaces or by simply bubbling the gas through the solution.

The permanganate is most effective at higher temperatures and consequently the gas may be delivered at the temperature at which it leaves the compressor, usually about 350° F. or at any lower temperature above the point of liquefaction to the permanganate solution. The permanganate readily removes substantially all objectionable odor and taste from the gas. In fact, no odor or taste has been detected in gas so treated, although without such treatment the gas leaving the compressor was quite foul and unsuitable for use in carbonating beverages.

After leaving the permanganate the gas may be dried by any known means such as contact with calcium chloride, silica gel, alumina and the like, none of which materials are capable of removing satisfactorily the odor and taste from the gas. The gas may be cooled then sufficiently to cause liquefaction, and if desired the liquid can be expanded to produce a solid product.

As an example of the invention, a water solution containing 5–10% or more of an alkali metal permanganate such as potassium permanganate is prepared, and this solution is made alkaline, preferably, by the addition of an alkali metal carbonate such as sodium carbonate. About 5% of the latter is sufficient, but more or less may be used. The solution is then introduced to a suitable tower or tank. In the former, the solution is preferably circulated and delivered at the top in the form of spray or permitted to trickle as a film over extended surfaces of a suitable filling material in the tower. The gas may be introduced at the bottom of the tower and may rise therethrough in intimate contact with the solution. If a tank is used the gas may merely bubble through the bulk of solution which need not be circulated.

The gas may be delivered from the final stage of compression at a pressure of delivery, for example, about 1000 pounds per square inch, directly to the tower or tank, or it may be partly cooled. It may be at any temperature from about 90° to 350° F., but a temperature of between 100° and 150° F. produces highly satisfactory results. The gas leaves the permanganate solution free from detectable odor or taste. It can then be dried by contact with calcium chloride, silica gel, alumina or the like and then cooled to effect liquefaction.

The essential feature of the invention is the treatment of the gas after the final stage of compression and at the pressure attained therein whether higher or lower than the customary 1000 pounds per square inch and at a temperature above the critical temperature and upward to about 350° F. with a permanganate solution to remove odor and taste therefrom. The resulting gas is a product uncontaminated with constituents which produce odor and taste therein and may be used for any of the purposes for which such a pure gas is adapted, and particularly in connection with products designed for human alimentary consumption.

The concentration of the permanganate solution, the alkalinity thereof, the pressure, and the temperature so long as the latter is above the temperature of liquefaction, are subject to wide variations in attaining the purpose of the present invention. The conditions stated are, however, those best adapted to secure the desired result.

Various changes may be made in the details of procedure and the apparatus employed without departing from the invention or sacrificing any of the advantages thereof.

I claim:

1. The method of purifying carbon dioxide and similar gases which comprises compressing the gas in stages and removing impurities, at least a portion of which result from the compression, by treating it after the final compression stage at the pressure attained in the final stage and at a temperature above the critical temperature of about 88° F. and upward to 350° F. with a solution of a permanganate of an alkali metal to remove odor and taste from the gas.

2. The method of purifying carbon dioxide and similar gases which comprises compressing the gas in stages and removing impurities, at least a portion of which result from the compression, by treating it after the final compression stage at the pressure attained in the final stage and at a temperature above the critical temperature of about 88° F. and upward to 350° F. with an alkaline solution of a permanganate of an alkali metal to remove odor and taste from the gas.

3. The method of purifying carbon dioxide and similar gases which comprises compressing the gas in stages and removing impurities, at least a portion of which result from the compression, by treating it after the final compression stage at the pressure attained in the final stage and at a temperature above the critical temperature of about 88° F. and upward to 350° F. with a 5–10% solution of a permanganate of an alkali metal to remove odor and taste from the gas.

4. The method of purifying carbon dioxide and similar gases which comprises compressing the gas in stages and removing impurities, at least a portion of which result from compression, by treating it after the final compression stage at the pressure attained in the final stage and at a temperature above the critical temperature of about 88° F. and upward to 350° F. with a solution of a permanganate of an alkali metal containing approximately 5% of an alkali metal carbonate, to remove odor and taste from the gas.

5. The method of purifying carbon dioxide and similar gases which comprises compressing the gas in stages and removing impurities, at least a portion of which result from the compression, by treating it after the final compression stage at the pressure attained in the final stage and at a temperature above the critical temperature of about 88° F. and upward to 350° F. with a 5–10% solution of a permanganate of an alkali metal containing approximately 5% of an alkali metal carbonate, to remove odor and taste from the gas.

FLOYD J. METZGER.